(12) United States Patent
Hanrahan

(10) Patent No.: US 7,929,245 B2
(45) Date of Patent: Apr. 19, 2011

(54) DAMPER FOR USE IN DISK DRIVE DATA STORAGE APPLICATIONS

(75) Inventor: Kevin P. Hanrahan, Santa Barbara, CA (US)

(73) Assignee: IntriPlex Technologies, Santa Barbara, CA (US)

( * ) Notice: Subject to any disclaimer, the term of this patent is extended or adjusted under 35 U.S.C. 154(b) by 754 days.

(21) Appl. No.: 11/717,329

(22) Filed: Mar. 13, 2007

(65) Prior Publication Data

US 2008/0226949 A1 Sep. 18, 2008

(51) Int. Cl.
*G11B 33/14* (2006.01)

(52) U.S. Cl. ..................................................... 360/97.02

(58) Field of Classification Search ............... 360/97.02; 720/651
See application file for complete search history.

(56) References Cited

U.S. PATENT DOCUMENTS

| | | | | |
|---|---|---|---|---|
| 4,819,094 A * | 4/1989 | Oberg | ......................... | 360/245.9 |
| 5,187,625 A * | 2/1993 | Blaeser et al. | ............. | 360/244.3 |
| 5,725,931 A | 3/1998 | Landin et al. | .................. | 428/134 |
| 5,858,521 A | 1/1999 | Okuda et al. | .................... | 428/219 |
| 6,212,043 B1 * | 4/2001 | Nakamura et al. | ......... | 360/244.3 |
| 6,271,996 B1 * | 8/2001 | Houk et al. | ................ | 360/244.9 |
| 6,297,933 B1 * | 10/2001 | Khan et al. | .................. | 360/244.2 |
| 6,498,704 B1 | 12/2002 | Chessman et al. | .......... | 360/265.9 |
| 6,512,658 B1 | 1/2003 | Jierapipatanakul et al. | .......................... | 360/264.7 |
| 6,594,114 B1 | 7/2003 | Suzuki et al. | ............... | 360/244.3 |
| 6,704,164 B1 * | 3/2004 | Hiraoka | ..................... | 360/244.8 |
| 6,879,466 B1 | 4/2005 | Oveyssi et al. | ............. | 360/265.7 |
| 6,937,444 B1 | 8/2005 | Oveyssi | ..................... | 360/265.8 |
| 2005/0094311 A1 | 5/2005 | Boss et al. | .................. | 360/97.01 |
| 2005/0095392 A1 | 5/2005 | Boss | ............................. | 428/68 |
| 2005/0158336 A1 | 7/2005 | Diamond | ................... | 424/192.1 |
| 2006/0098332 A1 | 5/2006 | Lee et al. | ................... | 360/97.02 |

OTHER PUBLICATIONS

"DuPont PYRALUX: Case Study: Storage and Easy Access to your Personal Library of Electronic Data at your Fingertips", printed Dec. 16, 2009 from DuPont de Nemours website.*
PCT Notification of Transmittal of the International Search Report and the Written Opinion of the International Searching Authority dated Jul. 25, 2008 for International Application No. PCT/US2008/056244 filed Mar. 7, 2008.
PCT International Preliminary Report on Patentability and the Written Opinion of the International Searching Authority dated Sep. 15, 2009 for International Application No. PCT/US2008/056244 filed Mar. 7, 2008.

* cited by examiner

*Primary Examiner* — Julie Anne Watko

(57) ABSTRACT

A damper for a data storage device having a viscoelastic material and a constraint material disposed on the viscoelastic material, the constraint material covers the sides of the viscoelastic material to reduce exposure of the viscoelastic material from debris in the surrounding environment.

9 Claims, 5 Drawing Sheets

DAMPER FOR USE IN DISK DRIVE DATA STORAGE APPLICATIONS

BACKGROUND OF THE INVENTION

1. Field of the Invention

The invention relates generally to the field of disk drives. More particularly, the invention relates to a damper for use in data storage applications.

2. Description of Related Art

A key component of any computer system is a device to store data. One common place for storing massive amounts of data in a computer system is on a disc drive. The most basic parts of a disc drive are a disc that is rotated, an actuator that moves a transducer to various locations on the disc, and electrical circuitry that is used to write and read data to and from the disc. Coupled to the actuator is a head-gimbal assembly (HGA) that includes a head and metal suspension. The HGA's can be stacked together into a head-stack assembly (HSA), which is propelled across the disk surface by the actuator. The HSA may include a voice coil and a set of magnets. When electric current is passed through the voice coil, an electromagnetic field causes the voice coil to move, and in turn, the HSA moves across the disk surface. There are a variety of disc drives in use today, such as hard disc drives, zip drives, floppy disc drives. All utilize either rotary or linear actuators.

Magnetic heads read and write data on the surfaces of rotating disks that are co-axially mounted on a spindle motor. The magnetically-written "bits" of information are laid out in concentric circular "tracks" on the surfaces of the disks. The disks must rotate quickly so that the computer user does not have to wait long for a desired bit of information on the disk surface to become positioned under the head. In modern disk drives, data bits and tracks must be extremely narrow and closely spaced to achieve the high density of information per unit area of the disk surface that is desired.

The required small size and close spacing of information bits on the disk surface have consequences on the design of the disk drive device and its mechanical components. Because there is relative motion between the disk surface and the magnetic head due to the disk rotation and head actuation, any contact between the head and disk, due to mechanical shocks or vibration, can lead to tribological failure of the interface. Such tribological failure, known colloquially as a "head crash," can damage the disk and head, and usually cause data loss. Vibration is particularly a serious problem when it occurs at or near the resonant frequencies of the disk drive components.

To reduce vibration problems in the disk drive assembly, several methods have been employed. One such method includes providing a damper on the actuator arm, head-gimbal assembly or head-stack assembly. Another method includes providing a damper disposed between adjacent load beams, as disclosed in U.S. Pat. No. 6,498,704. A further method includes interposing a damper between the outer surfaces of the hard disk drive assembly and the inner surface of a housing that contains the hard disk drive assembly, as disclosed in U.S. patent application Ser. No. 11/269,545.

Referring to FIG. 1, a typical prior art damper 9 may include a constraint material 11 and a viscoelastic layer 13. The viscoelastic material 13 may be made of a viscoelastic polymer with a double sided pressure sensitive adhesive, while the constraint material 11 may be made of aluminum, steel, zinc, copper or ceramic. The viscoelastic layer 13 absorbs and reduces external shocks or vibrations, while the constraint material 11 provides sheer damping capabilities.

The viscoelastic layer 13 may be disposed between a component of the hard disk drive and the constraint material 11. Typically, a viscoelastic adhesive is used to couple the viscoelastic layer 13 to the constraint material 11. This viscoelastic adhesive may squeeze-out or otherwise migrate during damping applications. Exposure of the viscoelastic adhesive to the hard disk drive assembly also tends to attract contamination, thereby creating a contaminated hard disk drive environment.

One method for reducing the exposure of the viscoelastic adhesive is to limit exposing the adhesive, by only exposing it at the edges 15. As shown in FIG. 2, the viscoelastic adhesive is only exposed at the edge 15 where the viscoelastic layer 13 has the same width as the constraint material 11. Another method for reducing exposure of the viscoelastic adhesive is by directing the cut edge of the constraint material 11 so that the burr height 19 will cover some fraction of the exposed edge of the viscoelastic layer 13.

FIG. 3 shows an edge 17 of the viscoelastic layer 13 protected by a burr 19 of the constraint material 11. FIG. 4 shows a viscoelastic layer 13 that is not as wide as the constraint material 11. The viscoelastic layer 13 is thereby set back and burr protected.

Since the cut edge burr 19 varies in height and the nominal height only covers a fraction of the exposed edge, the edge of the viscoelastic layer 13 still remains exposed and accessible to be mechanically dislodged and to be contaminated. With an increasing demand for improved dampers for use in data storage devices, there remains a need in the art for a damper that protects the viscoelastic layer from contamination.

SUMMARY OF THE INVENTION

A damper for a data storage device having a viscoelastic material and a constraint material disposed on the viscoelastic material. The constraint material is formed or coined to have an edge offset or a flanged edge for covering the sides of the viscoelastic material. This considerably reduces exposure of the viscoelastic material to debris. The viscoelastic material may be a viscoelastic polymer with a double sided, pressure sensitive adhesive. The constraint material may be made of aluminum, stainless steel, nickel-plated stainless steel, zinc, copper, ceramic, nickel, mylar or elastomeric material.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
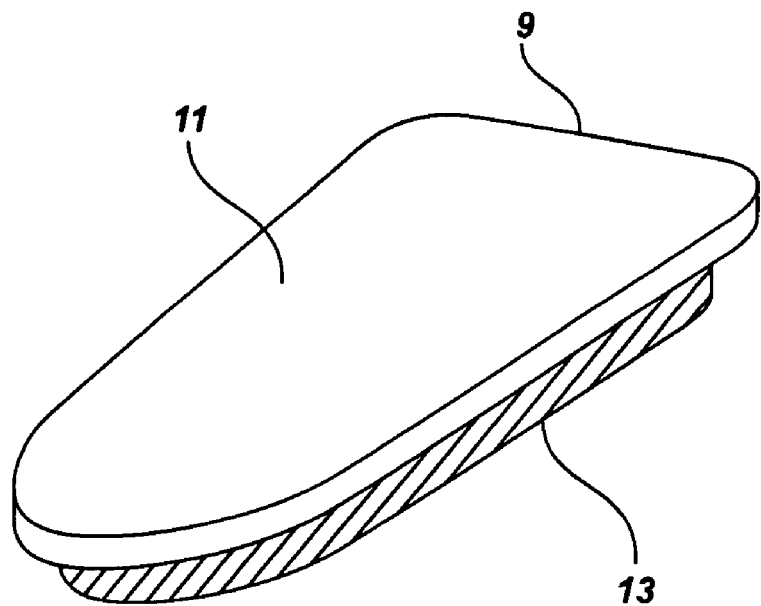
FIG. 1 is a perspective view of a prior art damper.
Figure 2:
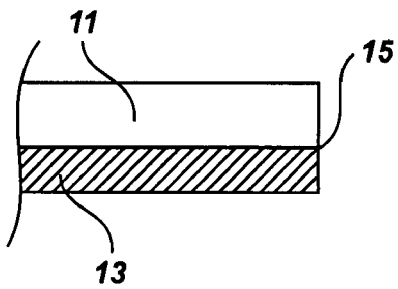
FIG. 2 is a cross-sectional view of a portion of a prior art damper with exposed viscoelastic adhesive edges.
Figure 3:
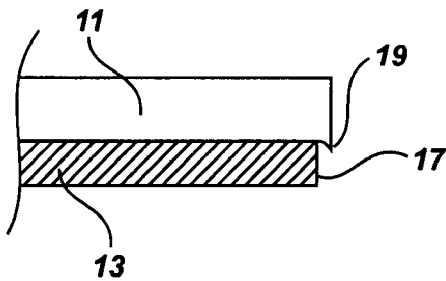
FIG. 3 is a cross-sectional view of a portion of a prior art damper with burr protected viscoelastic adhesive edges.
Figure 4:
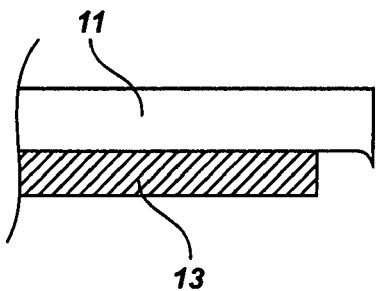
FIG. 4 is a cross-sectional view of a portion of a prior art damper with a viscoelastic layer set back and burr protected.
Figure 5:
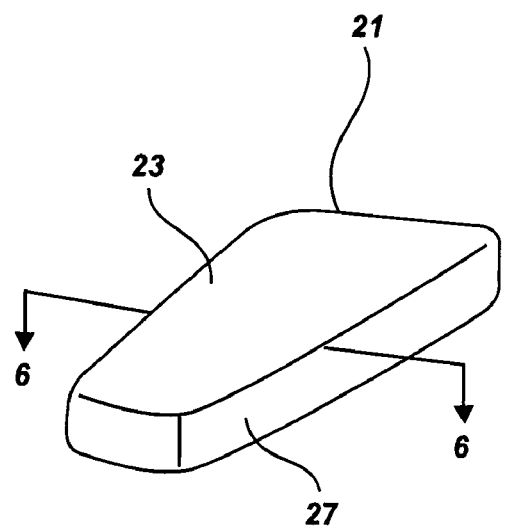
FIG. 5 is a perspective view of a damper according to an embodiment of the present invention.
Figure 6:
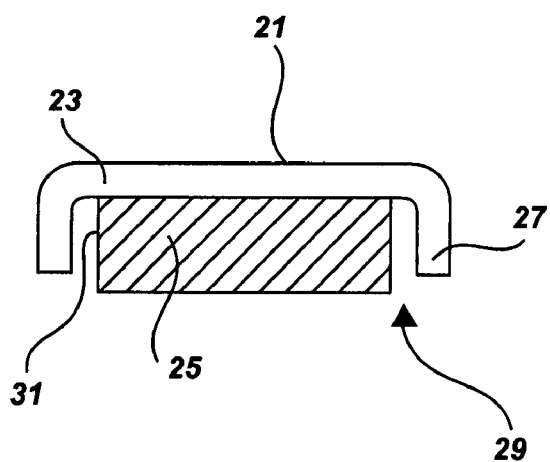
FIG. 6 is a cross-sectional view of the damper of FIG. 5 along line 6-6.

FIG. 5 is a perspective view of a damper 21 for use in data storage applications, according to an embodiment of the present invention. FIG. 6 is a cross-sectional view of the damper 21 of FIG. 5 along line 6-6.

Referring to FIGS. 5 and 6, the damper 21 includes a constraint material 23 and a viscoelastic layer 25. The viscoelastic layer 25 absorbs and reduces external shocks or vibrations, while the constraint material 23 provides sheer damping capabilities. A viscoelastic adhesive may be used to couple the viscoelastic layer 25 to the constraint material 23. The viscoelastic layer 25 may be formed of a viscoelastic polymer with a double sided pressure sensitive adhesive. The viscoelastic layer 25 may be adapted to maintain the constraint material 23 in position against a component of a data storage device. The constraint material 23 is preferably stainless steel, but may be formed of a non-magnetic materials, such as, aluminum, stainless steel, nickel-plated stainless steel, zinc, copper, nickel, mylar, ceramic material, viscoelastic or elastomeric material. The viscoelastic layer 25 and the constraint material 23 are selected so that the frequencies damped are in a desired range of interest.

As shown in FIGS. 5 and 6, the constraint material 23 is shaped with an edge offset 27 that encloses the viscoelastic layer 25. The edge offset 27 extends a predetermined distance. A forming or coining technique, well known to persons skilled in the art, is used to accomplish this. The predetermined distance is sufficient to enclose the side 31 of the viscoelastic layer 25. The coining technique used to shape the constraint material 23 creates a pocket 29 in the constraint material 23 with which the viscoelastic layer 25 is positioned, thereby enclosing the adhesive material.

By enclosing the adhesive on the viscoelastic layer 25, less contamination or damage potential occurs. Contamination can only occur if debris entering into the inlet 29 between the inside walls of the edge offset 27 of the constraint material 23 and side 31 of the viscoelastic layer 25. However, even if the viscoelastic layer 25 is contaminated, the shape of the enclosure of the constraint material 23 prevents subsequent mechanical dislodging of debris, thereby preventing contamination of the hard disk drive environment. Accordingly, the shape of the constraint material 23 forms a debris trap that limits debris from attaching to or detaching from the viscoelastic layer 25.

Another advantage of the present invention is that the stiffness of the constraint material 23 increases due to the edge offset 27. This stiffness increase may be used to tune the damper 21 for optimum performance. The stiffness increase may be used to develop smaller and/or less massive dampers 21 than those used in the prior art, while providing similar structural and functional benefits.

Figure 7:
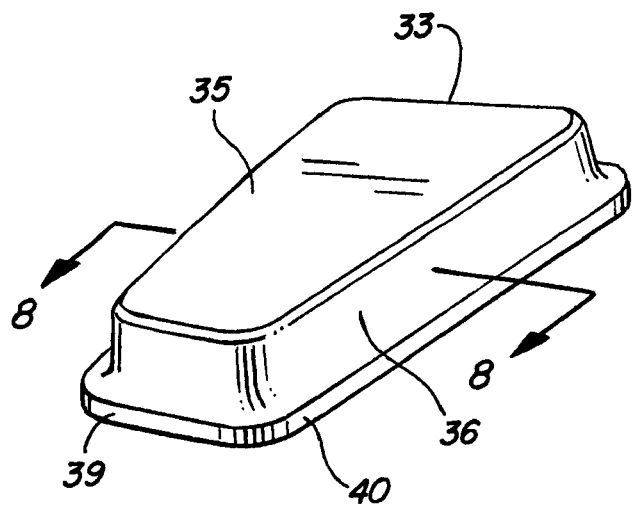
FIG. 7 is a perspective view of a damper according to another embodiment of the present invention.
Figure 8:
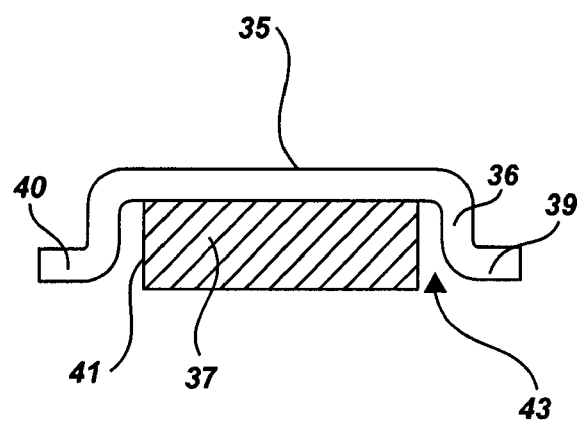
FIG. 8 is a cross-sectional view of the damper of FIG. 7 along line 8-8.

FIG. 7 is a perspective view of a damper 33 for use in data storage applications, according to another embodiment of the present invention. FIG. 8 is a cross-sectional view of the damper 33 of FIG. 7 along line 8-8.

Referring to FIGS. 7 and 8, the damper 33 includes a constraint material 35 and a viscoelastic layer 37. The viscoelastic layer 37 absorbs and reduces external shocks or vibrations, while the constraint material 35 provides sheer damping capabilities. The viscoelastic layer 37 and the constraint material 35 are selected so that the resultant damper 33 damps frequencies in a desired range.

The constraint material 35 of FIGS. 7 and 8 is shaped to have an edge offset 36 with a flange edge 39. This shape encloses the viscoelastic layer 37. The edge offset 36 with flanged edge 39 is fabricated to extend a predetermined distance using a well-known forming or coining technique. Preferably, the predetermined distance of the edge offset 36 is sufficient to cover the side 41 of the viscoelastic layer 37. The fabrication process creates an inlet 43 in the constraint material 35 with which the viscoelastic layer 25 is positioned, enclosing the adhesive material.

By enclosing the adhesive on the viscoelastic layer 37, less contamination or damage potential occurs. Contamination can only occur if debris enters the inlet 43 between the inside walls of the edge offset 36 and the side 41 of the viscoelastic layer 37. Once the viscoelastic layer 37 is contaminated, the shape of the constraint material 35 prevents subsequent mechanical dislodging of debris thereby preventing contamination of the hard disk drive environment. Accordingly, the enclosure formed in the constraint material 35 forms a debris trap that limits debris from attaching to or detaching from the viscoelastic layer 37.

One advantage of fabricating damper 33 is the relative ease in manufacture. It is easier to vertically cut side 40 of the flanged edge 39 for damper 33 rather than horizontally cut the edge offset 27 for damper 21. Another advantage of damper 33 is the increased time for travel or migration of debris from the inlet 43 to side 40 of the flanged edge 39. The debris must travel across the length of the flanged edge 39 before being exposed to the hard disk drive environment.

Another advantage of damper 33 is that the stiffness of the constraint material 35 increases due to the edge offset 36 and the flanged edge 39. This stiffness increase may be used to tune the damper 33 for optimum performance. The stiffness increase may be used to develop smaller, less massive dampers 33 than those used in the prior art, while providing similar structural and functional benefits.

Figure 9:
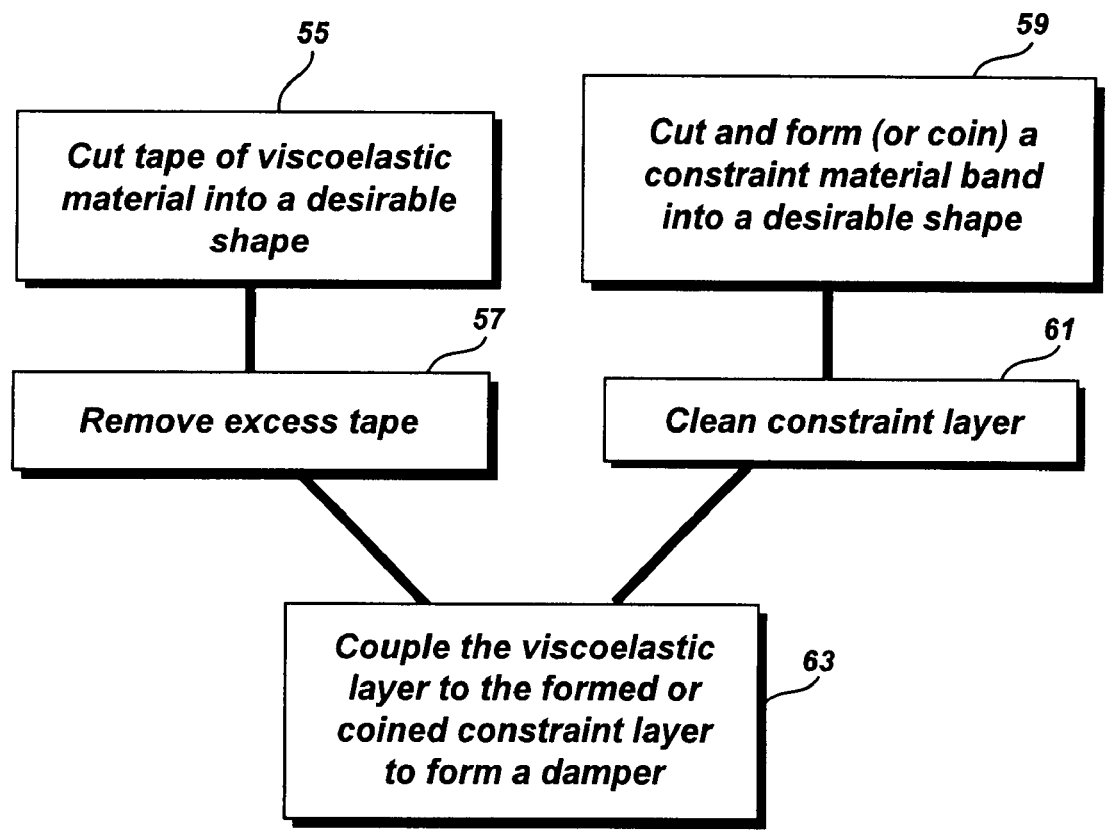
FIG. 9 is a flow chart depicting a method for fabricating a damper, of the present invention.

A method for fabricating the constraint material 35 for use in a data storage device is illustrated in FIG. 9. The viscoelastic layer 25 or 37 is prepared by cutting a viscoelastic tape into a desirable or predetermined shape, step 55, and removing any excess tape, step 57. The desirable or predetermined shape of the viscoelastic layer 25 or 37 may be any shape or size for achieving desirable damping characteristics in the data storage device. For example, the viscoelastic layer 25 or 37 may be used to provide damping to the voice coil of a head-stack assembly (not shown), and accordingly, the viscoelastic layer 25 or 27 is shaped to fit in the bobbin space between the voice coil. In another example, the viscoelastic layer 25 or 37 may be used to provide damping to an actuator arm, and accordingly, the viscoelastic layer 25 or 27 is shaped to substantially the same dimensions as the actuator arm or portions thereof.

The constraint material 23 or 35 is prepared by cutting and forming (or coining) a clean constraint material band, such as a stainless steel band, into the desired predetermined shape, step 59. The fabricated constraint material 23, 35 is cleaned to remove any debris resulting from the fabrication process, step 61. As can be appreciated from the aforementioned embodiments, the desirable shape of the constraint material 23 or 35 may include an offset edge 27 or an offset edge 36 with a flange edge 39 that forms a well 29, 43 in which the viscoelastic layer 25, 37 is positioned, enclosing any adhesive material from exposure to contamination.

Once the viscoelastic layer 25, 37 and the constraint material 23, 35 are shaped, they are joined together to form a damper 21 or 33, step 63. The viscoelastic layer 25, 37 and the constraint material 23, 35 may be joined by co-piloted joining.

In all of the above described embodiments, the intended use in a disk drive suggests suitable ranges for the physical properties of the dampers. The constraint material 23, 35 thickness typically ranges from as low as possible, on the order of about 0.0002" to about 0.005". The viscoelastic layer 25, 37 typically is within the same thickness range, although there is no requirement for the two to be of equal thickness for a particular implementation. In length, the dampers 21 or 33 may range from about 0.200" up to about 2.000" with a width, not necessarily constant along the length, ranging from about 0.100" up to about 1.000". In addition, more than one ply of constraint material 23, 35 and viscoelastic layer 25, 37 may be used, forming an arrangement that may be multi-level or constrained on both top and bottom.

What is claimed is:

1. A damper for a data storage device comprising:
   a viscoelastic material having a top and bottom, with the bottom attached to a surface of the data storage device to absorb and reduce external shock and vibration; and
   a solid constraint material attached to the top of the viscoelastic material by an adhesive, as a cover for the viscoelastic material, with an edge offset extending toward the surface of the data storage device, covering the sides of the viscoelastic material, the edge offset forming a pocket between an inside wall of the edge offset and a side of the viscoelastic material for containing the adhesive.

2. The damper of claim 1, wherein the viscoelastic material is a viscoelastic polymer with a double sided pressure sensitive adhesive on the top and bottom.

3. The damper of claim 1, wherein the constraint material is selected from a group consisting of aluminum, stainless steel, nickel-plated steel, zinc, copper, nickel, ceramic, mylar and elastomeric material.

4. The damper of claim 1, wherein the constraint material also has a flanged edge extending from the edge offset parallel to the surface of the data storage device.

5. The damper of claim 1 wherein the viscoelastic material thickness ranges from as low as about 0.0002" to as much as about 0.005".

6. The damper of claim 1 wherein the constraint material thickness ranges from as low as about 0.0002" to as much as about 0.005".

7. The damper of claim 1 wherein the length of the damper ranges from about 0.200" to as much as about 2.000".

8. The damper of claim 1 wherein the width of the damper ranges from about 0.100" to as much as about 1.000".

9. The damper of claim 1 comprising at least one additional layer of viscoelastic material.

* * * * *